United States Patent Office 3,381,267
Patented Apr. 30, 1968

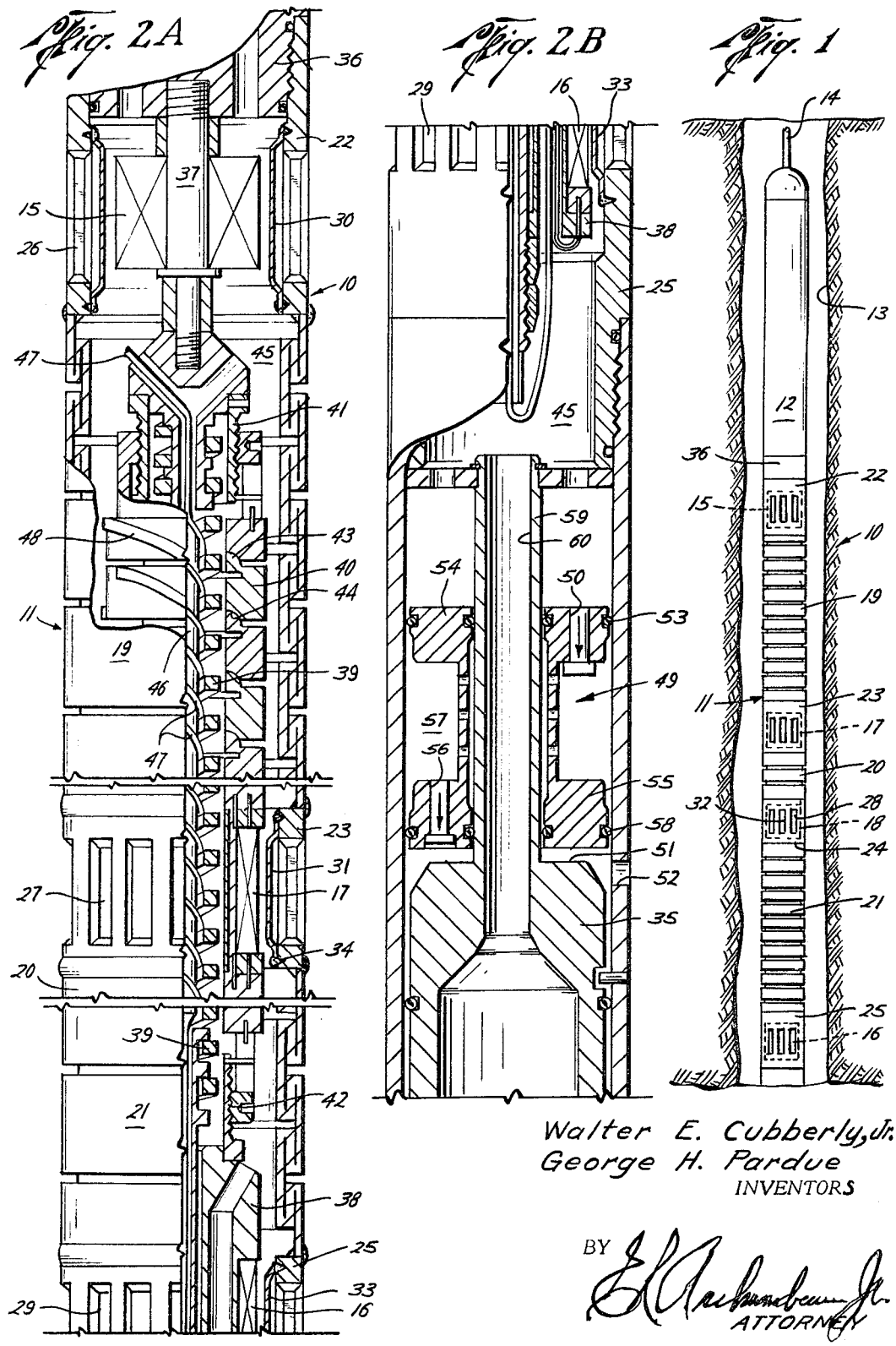

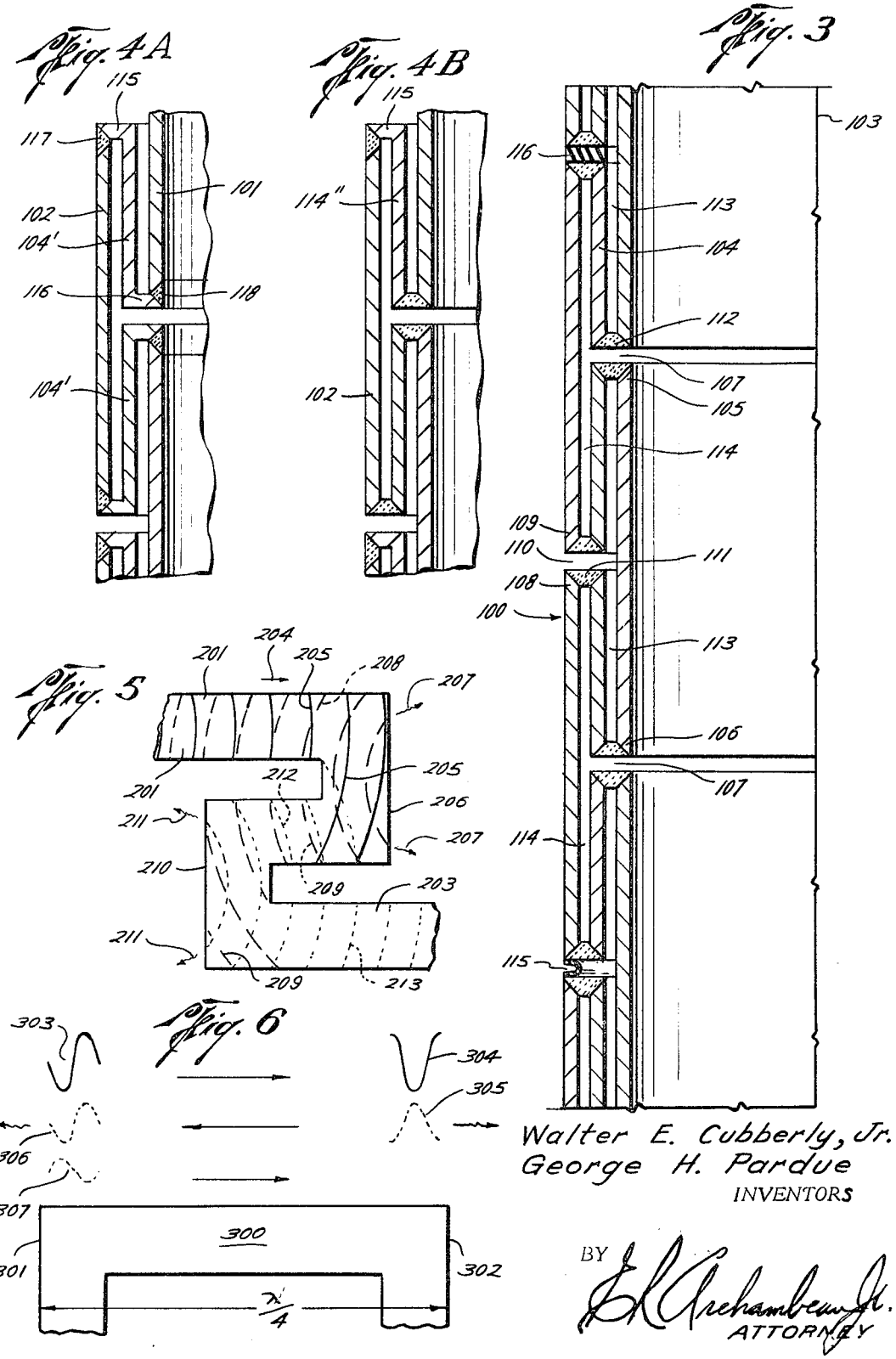

3,381,267
WELL LOGGING TOOL
Walter E. Cubberly, Jr., and George H. Pardue, Houston, Tex., assignors to Schlumberger Technology Corporation, Houston, Tex., a corporation of Texas
Filed July 26, 1966, Ser. No. 568,706
15 Claims. (Cl. 340—17)

ABSTRACT OF THE DISCLOSURE

The particular embodiments described herein as illustrative of the present invention are directed toward pressure-tight rigid housings for sonic logging tools, with these housings being appropriately arranged to effectively attenuate any sonic energy that would otherwise travel longitudinally along the housing. These new and improved housings are arranged as a plurality of overlapping, successively alternating concentric inner and outer sleeves respectively joined at their adjacent opposed ends by a shorter, intermediate sleeve between the inner and outer sleeves. In this manner, a rigid housing is formed with a large number of reversed paths and interface surfaces to provide an extremely tortuous path for attenuation of sonic energy that would otherwise travel longitudinally along the housing.

---

Accordingly, as will subsequently become apparent, this invention relates to sonic well logging tools; and, more particularly, to new and improved rigid housings for acoustic logging apparatus which include means for attenuating longitudinally traveling sonic signals. The housings can further be made gas-tight.

A typical sonic well logging tool is usually comprised of at least three sonic transducers mounted on a support at longitudinally spaced intervals from one another. Two of these transducers are arranged as receivers and the other serves as a transmitter which periodically emits short pulses of sonic energy in all directions into the media surrounding the logging tool. A sonic pulse detected by a receiver typically operates either a downhole or surface timing circuit. Then, when the same pulse is subsequently detected by the more distant receiver, the timing circuit measures the elapsed time from which the velocity of sound through that portion of the surrounding media between the receivers can be determined. In more sophisticated systems, the wave forms of the detected pulses are also examined to determine amplitudes and other useful information.

The velocity of sound through liquids typically found in a well bore (usually so-called "muds") is in the order of 5,000-feet per second. On the other hand, the velocity of sound through earth formations will range from about 5,000-feet per second to about 25,000-feet per second. By way of comparison, metals can have sonic velocities ranging between 13,000 and 20,000-feet per second.

Accordingly, since the velocity of sound through earth formations is substantially higher than through mud or other well bore fluids, a sonic signal will travel much faster through a formation than it will through the well bore. By properly spacing the transducers, the receivers will detect a sonic signal that has passed through the adjacent earth formations long before the signal can pass directly through the fluids in the borehole. Thus, by selectively operating the receivers only long enough to receive those signals passing through the formations, the slower and unwanted signals will not be detected. In some systems, however, it is necessary to operate the receivers slightly longer to detect, for example, variations in wave forms. When this is done, the unwanted signals are filtered out by suitable electronic circuitry.

It will also be recognized that a sonic logging tool must be so arranged that detectable sonic energy will not be transmitted longitudinally along the support between the transducers at a velocity comparable to that of sound through earth formations. Obviously, if this is not done, unwanted sonic signals will pass along the support and arrive as the receivers as the desired signals are received and prevent an accurate determination of the composite velocity of sound through the adjacent earth formations as well as hinder analyses of the pulse wave forms where necessary. Another problem that may arise is "ringing" in a housing that will be of the same nature as that occurring in a bell. Thus, to avoid further interference from such sources with reception of signals, it is necessary to arrange the housing in such a manner that it is sonically dampened.

Accordingly, it has been customary heretofore to mount the transducers on a support having either a low sonic transmissibility or some means for attenuating or delaying the sonic energy traveling longitudinally along the support. Typical of these supports having a low sonic transmissibility are those in which the transducers are either embedd in or mounted on an elastomeric or plastic material. It is obvious to those skilled in the art, however, that in addition to being subject to damage while being handled, such tools are too flexible to be "spudded" past an obstruction in a well bore. Moreover, where transducers are embedded in an elastomeric or plastic material, their performance will be affected.

As exemplary of those rigid housings that attenuate sonic energy traveling along the support, the apparatus disclosed in Patents Nos. 3,191,388, 3,191,141, 3,191,142 and 3,191,143 are typical. Although each of these have been successful, these supports are open and exposed to well control fluids which, in time, will corrode or damage the wiring and the sonic transducers. Enclosure of such open supports with elastomeric materials and the like have not been too successful inasmuch as this often affects the radial transmission of sound. Moreover, where the logging tool is used in either a gas-filled borehole or in one having a liquid therein with a substantial quantity of gas in solution, gases will slowly permeate through elastomeric materials while the tool is in the borehole. Then, as the logging tool is removed from the well bore, the entrapped gases will be unable to escape rapidly from the logging tool and may quite possibly burst the elastomeric linings. Moreover, even though these housings are "rigid" there is a certain amount of flexibility which may be undesirable for all around field use.

Accordingly it is an object of the present invention to provide new and improved sonic logging tools that have a relatively high mechanical strength and include means for significantly attenuating sonic energy travelnig longitudinally therethrough as well as dampening of sonic "ringing."

A further object of the present invention is to provide new and improved rigid enclosures for sonic logging tools that can be fully sealed and made gas-tight.

To accomplish these and other objects of the present invention, a relatively rigid, high-strength tubular body or housing is arranged for carrying spaced acoustic transducers. This housing includes inner and outer tubular sections telescoped together and disposed along a common central axis at longitudinally spaced intervals from their companion sections and staggered relative to the other sections. To joint the tubular sections, a plurality of longitudinally spaced shorter sections are disposed in the annulus between the inner and outer members. By arranging each shorter section to extend from one end of an outer section and under that outer section to the opposite end of the adjacent inner section, a continuous and rigid tubular housing of staggered inner and outer members will be formed upon joining these ends. Sonic energy traveling along these portions of the housing will be so attenuated that no significant amount of sonic energy can be transmitted along the housing or cause the housing to continue to reverberate. Moreover, by employing tubular members for these intermediate sections and sealingly joining these section ends to the inner and outer members, a gas-tight enclosure will be provided.

The novel features of the present invention are set forth with particularity in the appended claims. The operation together with further objects and advantages thereof, may best be understood by way of illustration and example of certain embodiments when taken in conjunction with the accompanying drawings, in which:

FIG. 1 is a view of a sonic logging tool arranged in accordance with the principles of the present invention;

FIGS. 2A–2B are enlarged successive cross-sectional views of a portion from the apparatus of FIG. 1;

FIG. 3 is a still further enlarged cross-sectional view to show one embodiment of the present invention;

FIGS. 4A and 4B are partial views similar to FIG. 3 but showing alternate constructional details of the present invention; and FIGS. 5 and 6 are simplified, schematic illustrations for aiding in an understanding of what may be at least a portion of the underlying theory of the present invention.

Turning now to FIG. 1, an enlarged, rigid sonic logging tool 10 having a lower housing 11 arranged in accordance with the present invention and an upper housing 12 is shown as it might appear within a well bore 13. The tool 10 is suspended from an armored electrical cable 14 that is spooled from a winch (not shown) at the earth's surface in the usual manner.

Inasmuch as the particular sonic logging system used here is of no consequence, to simplify the explanation of the invention it will be assumed that a pair of transmitting transducers 15 and 16 and a pair of receiving transducers 17 and 18 are mounted in the lower housing 11 of the tool 10 and, most, if not all, of the electronic circuitry is mounted in the upper housing 12. Typical of such logging systems is that described in Patent No. 3,257,639 to Frank P. Kokesh. Briefly stated, in the Kokesh system, the transducers 15–18 which may, for example, be of the magnetostrictive type and are suitably supported in a fixed spaced relationship to one another in a well-known manner in the tool. The transducer arrangement provided includes an upper transmitter 15, an upper receiver 17, a lower receiver 18 and a lower transmitter 16 in longitudinal alignment, with the spacing between the transmitter 15 and receiver 17 being made equal to the spacing between the transmitter 16 and receiver 18. Preferably, this spacing is on the order of three feet and the span between receivers 17 and 18 is on the order of one foot. The transmitter 15 and receiver 17 are thus symmetrical relative to the transmitter 16 and receiver 18 about a plane of symmetry midway between receivers 17 and 18.

The operational arrangement of this system is such that the time of emission of a pulse of acoustic energy from a transmitter can be reliably detected at the earth's surface and the acoustic energy as detected by a receiver can be representatively reproduced as an electrical signal at the earth's surface and the travel time of acoustic energy from the transmitter and through the adjacent media forming the well bore and back to a receiver can be measured with considerable accuracy. At the earth's surface, the transmitter-to-receiver signals are received by the electronic circuitry from the downhole tool 10 in a sequence in which one transmitter is pulsed twice to provide emission signals alternating with signals respectively detected by receivers spaced a long and a short distance from the first transmitter; the other transmitter is also pulsed twice to provide emission signals alternating with signals respectively detected by receivers spaced a long and a short distance from the second transmitter. A pair of the sequenced signals thus represents the time interval between the emission of an acoustic pulse and its arrival at a given receiver. In the electronic circuitry, a first time interval between the emission of an acoustic pulse and its arrival at a given receiver spaced the long distance from the first transmitter is stored in a counter circuit. A second time interval between the next succeeding acoustic emission of the first transmitter and the arrival of acoustic energy at the receiver spaced the short distance from the first transmitter is then subtracted from the first time interval. The next time interval between the emission of an acoustic impulse by the second transmitter and its arrival at a receiver spaced the long distance from the transmitter is added into the counter circuit. The subsequent time interval between the emission of an acoustic impulse by the second transmitter and its arrival at a receiver spaced the short distance from the transmitter is subtracted from the counter circuit. Thus, the net time interval count left in the counter is representative of two distinct times of travel of acoustic energy over a section of adjacent media between the two receivers. The net time interval in the counter is divided by two thereby to provide an average travel time of acoustic energy over the section of adjacent media. One of the prime advantages of this system is that the longer time intervals measured between an emission and detection of acoustic energy permit time for accurate transmission of the signals to the earth's surface whereas with a short spacing between receivers it is difficult to transmit the signals directly to the earth's surface. The transmitters above and below the receivers further provide for time measurements substantially independent of the instrument position relative to the wall or geometry of the well bore. It will be recognized, of course, that four receivers could also be used instead of the two described above in accordance with Patent No. 3,304,536.

Without going into the particular details at this point the lower housing 11 is arranged in accordance with the present invention to provide a rigid, gas-tight enclosure that will significantly attenuate sonic energy. As one aspect of this attenuation, one portion 19 of the lower housing 11 is suitably arranged to prevent the travel of any significant amount of sonic energy along that portion itself between the transducers 15 and 17. Similarly arranged sections 20 and 21 are respectively arranged between the transducers 17 and 18 and the transducers 16 and 18. As another aspect of the attenuation properties of these housing sections 19–20, they are also particularly arranged to greately dampen, if not eliminate, any "ringing."

To permit relatively unimpeded radial transmission of sonic energy to and from the transducers 15–18, means, such as a plurality of housing sections 22–25 respectively having circumferentially spaced vertical slots 26–29 (FIGS. 2A–2B), are provided in the housing portions opposite each of the transducers. These slots 26–29 each provide "windows" through which sonic signals may pass radially with little or no interference or attenuation. Thin-wall sleeves 30–33 are respectively disposed behind the slots 26–29 and fluidly sealed by seal welding, as at 34, on each end to the housing sections 22–25, respectively, to prevent entry of well bore fluids. The upper and lower ends of the lower housing 11 are, of course, closed by suitable closure members, as at 35 on the bottom and a housing sub 36 at the top. In this manner, the tool 10 will be of sufficient strength and rigidity that it can withstand rough treatment in and out of a well bore. Moreover, inasmuch as the tool 10 is fluid-tight, the transducers 15–18 and other components therein will not be exposed to the corrosive and dirty well bore fluids.

Accordingly, as best seen in FIGS. 2A and 2B, the upper transducer 16 is mounted on a central support member 37 depending from the interconnecting housing sub 36 between the upper and lower housings 11 and 12. The intermediate and lower transducers 16–18 are not directly mounted on the lower housing 11, however, but are instead dependently supported below the upper transducer 15. To accomplish this, the lower transducer 16 is mounted on a tubular member 38 and suspended below the upper transducer 15 by a helical spring 39 secured at its upper end to the central member 37 and at its lower end to the tubular member 38.

It will be understood, of course, that since the total helical length of the spring 39 is significantly longer than the straight-line length of the spring, sonic signals traveling along the spring will be materially delayed so as not to interfere with the reception of the desired signal by the receivers 17 and 18. A plurality of flat, annular, vertebrate-like members 40 are stacked between the upper and lower transducers 16 and 18 and appropriately distributed above and below the intermediate transducer 17 to support it in the proper relation to the other transducers. The tension of the spring 39 is sufficiently strong that the verebrate members 40 will be held into a fairly rigid stacked column.

It will be appreciated, therefore, that by appropriately adjusting the tension of the spring 39 and arranging the number of vertebrate members 40 between the transducers 15–18, the intermediate and lower transducers will be maintained in whatever fixed relationship is desired. Thus, in effect, the intermediate and lower transducers 16–18 are dependently secured below the upper transducer 15 by an axially rigid, but laterally articulated, column of the stacked vertebrate members 40. To ensure that the intermediate and lower transducers 16 and 18 will be exactly opposite their respective slots 27 and 29, adjusting means, such as threaded collars and sleeves 41 and 42, are provided in the column.

The vertebrate members 40 must, of course, be so arranged that sonic energy transmitted through them is either substantially attenuated or sufficiently retarded as not to interfere with the detection of those sonic signals returning from the earth formations. Briefly, the vertebrate members 40 are, therefore appropriately arranged to provide a quite substantial attenuation of sonic energy so that an interferring sonic signal will not be transmitted direcly therethrough from the transmitting transducers 15 and 16 to the receiving transducers 17 and 18.

To accomplish this, the vertebrate members 40 are spaced apart by short longitudinal studs, as at 43, projecting from one transverse face of each member and which are each received in a complementary recess 44 in the opposed transverse face of the adjacent member. In this manner, although the vertebrate members may even be of metal, the innumerable changes to and from alternating transverse cross-sectional areas along the stack will create such an impedance mismatch at each transition that little or no sonic energy will be transmitted through the column of the stacked members 40. Moreover, each time a sonic signal passing through the stacked members 40 changes direction in the column or is reflected in the column or is reflected by the impedance mismatch, a portion of the signal will be transmitted into the surrounding media where it will be attenuated.

It will be appreciated that although the housing 11 is substantially strong, it may nevertheless be subjected to some flexing as it is being handled. To compensate for such flexure, three of the projections 43 are uniformly spaced about the central axes of each of the vertebrate members 40 and the free end of each projection is rounded to provide a fragmentary portion of a transverse spherical surface that, if complete, would circumscribe each of the projections. The complementary recesses 44 formed in the opposite transverse face of each of the vertebrate members 40 are each appropriately positioned and arranged for receiving one of the projections 43. Inasmuch as the co-engaged surface of the projections 43 and their respective shallow recesses 44 are generally spherical, the stacked vertebrate members 40 are free to tilt relative to one another and about their longitudinal axis in any direction. In this manner, the stacked column of vertebrate members 40 is substantially articulated and will freely flex should the housing 11 be bent.

With the metal sleeves 30–30 in place within the housing 11, it will be appreciated that to efficiently transfer sonic energy in a radial direction, the enclosed space 45 therein must be filled with some suitable liquid. Since the velocity of sound through oil is in the order of 4,000–5,000-feet per second, an oil is used to fill the housing space 45 since sonic signals can not be transmitted thereby longitudinally within the housing any faster than they can travel longitudinally through the well bore 13 outside of the tool 10. It will be understood, of course, that since the radial clearance between the transducers 15–18 and the metal sleeves 30–33 is relatively small, there will be no appreciable effect on the radial transmission and reception of sound.

It will be appreciated that a great number of conductors must be passed from the upper housing 12 into the lower housing 11 and possibly even further therebelow to other tools (not shown). Accordingly, to accommodate such conductors, a central member 46, such as an elongated cylindrical member of a sound-attenuating material, such as plastic or the like, is extended through the stack of vertebrate members 40 and the spring 39. As best seen in FIG. 2A, this cylindrical member 46 will permit conductors, as at 47, to be coiled thereabout and be confined between adjacent turns of the spring 39. Similarly, it has also been found advantageous to provide one or more external slanting ribs, as at 48, about the exterior of each vertebrate members 40 to form channels for other conductors (not shown) to be passed around the members in addition to through the vertebrate members.

To accommodate volumetric changes in the oil filling the enclosed space 45 that are due to variations in borehole temperature and to equalize pressures inside and outside of the tool 10, a floating compensating piston 49 (FIG. 2B) having a normally-closed check valve 50 therein is slidably disposed in the lower portion of the housing 11 and normally engaged with a stop, as at a housing shoulder 51. The enclosed space 45 is filled through a filling port (not shown) with a sufficient quantity of a suitable hydraulic oil to displace the piston 49 against the shoulder 51. By arranging the check valve 50 to open to discharge oil from within the housing 11 but remain closed to prevent the entry of borehole fluids into the enclosed space 45, it will be appreciated that as the oil expands from an increase in temperature, a sufficient amount of it will be discharged through the check valve to prevent rupture of the thin metal sleeves 30–33. Should the hydrostatic pressure increase sufficiently or the ambient temperature decrease, the piston 49 is of course free to move upwardly to maintain the space 45 filled.

Well bore fluids will be admitted by way of a lateral port 52 into that portion of the housing 11 below the piston 49. Thus, should the piston 49 be displaced upwardly, the internal walls of the housing will be coated with mud and the like from the well bore fluids as the walls are exposed by movement of the piston. Then, whenever the piston 49 is returned to its original position by either a further expansion of the oil or upon replenishing of the supply during subsequent maintenace, it is expected that small residual amounts of the mud will most likely remain on the cylinder walls and be passed over by the sealing members, as at 53, on the piston. It is of course undesirable to permit the oil in the space 45 to be contaminated by such foreign material.

Accordingly, to prevent contamination of the oil in the enclosed space 45, it is preferred to arrange the piston 49 with spaced piston portions 54 and 55 and mount another check valve 56 in the lower piston portion 55 that is similar to the check valve 50 already described. In this manner, the space 57 between the piston portions 54 and 55 will serve as an intermediate chamber that will trap any contaminants that may pass beyond the lower piston portion 55. It is also expected that the sealing members, as at 58, on the lower piston portion 55 will wipe away a substantial amount of any contaminant coating the cylinder wall to greatly reduce the amount of contaminants entering the space 57. Then, as the oil is replenished, an excess amount can be added through the filling port (not shown) to flush any contaminants in the space 57 through the check valve 56.

Although the piston 49 could just as well be a solid cylinder, it will be noted from FIG. 2B, that the piston is preferably made annular and is disposed around a tubular member 59 in the lower end of the housing 11. In this manner, a passage 60 is provided for electrical conductors (not shown) leading to other tools (not shown) below the logging tool 10. It should be noted that the vertebrate members 40 serve still another useful function, i.e., to reduce the amount of oil required to fill the enclosed space 45 but without materially increasing the overall weight of the tool 10. By using such materials as aluminum and magnesium, a substantial portion of the volume in the space 45 can be filled without too much additional weight. Thus, by reducing the total volume of oil in the space 45, the charge in oil volume due to temperature variations will be significantly reduced.

Turning now to the present invention. As previously mentioned, each of the housing sections 19–21 are arranged to prevent the travel of any significant amount of sonic energy through the lower housing 11 as well as to materially dampen any "ringing" therein. To accomplish this, each of the housing sections 19–21 are arranged as best shown in FIG. 3.

As seen in FIG. 3, a housing section 100 is comprised of a plurality of overlapping, alternated inner and outer concentric sleeves 101 and 102 longitudinally spaced along a common central axis 103, with these overlapping sleeves being joined to one another at their opposed adjacent ends by a plurality of shorter intermediate-diameter sleeves 104 to form a continuous, uninterrupted, fairly rigid, tubular body. In this manner the opposite ends 105 and 106 of each of the inner sleeves 101 are received inside of adjacent outer sleeves 102 and these ends are spaced apart to leave an internal gap 107 and are respectively joined to the opposed ends 108 and 109 of these adjacent outer sleeves by two of the shorter intermediate sleeves 104. The outer sleeves 102 are also spaced apart to leave an external peripheral gap 110 between the ends 108 and 109 of each pair of adjacent outer sleeves. By joining the various ends 105, 106, 108 and 109 of the concentric sleeves 101, 102 and 104 with continuous welds, as at 111 and 112, the housing section 100 will be fluid-tight and define a series of alternated annular spaces 113 and 114 that are respectively open to the exterior and interior of the section through the gaps 107 and 110.

In one embodiment of the present invention, the concentrically arranged sleeve 101, 102 and 104 were each formed of steel tubing having a nominal wall thickness of about ⅛-inch. The outer members 102 had an outside diameter of 3⅝-inches, the intermediate members 104 had an outside diameter of 3⅜-inches, and the inner members 101 had an outside diameter of 3⅛-inches. The radial clearances between each adjacent pair of members 102 and 104 and 101 and 104 was 0.005-inch and obtained by appropriate sizing of the sleeves. The gaps 107 and 110 were each 0.10-inch in width and the longitudinal length of each of the inner and outer sleeves 101 and 102 was 1.40-inches. For reasons that will subsequently be explained, this length for these sleeves 101 and 102 was selected so as not to exceed a quarter wavelength in steel at the design sonic excitation frequency for the transducer 16. The above dimensions are meant to be illustrative but are not intended to limit the scope of the present invention.

To fabricate the housing sections 100, the tubular members 101, 102 and 104 are successively joined to one another in such a manner that the sections are progressively assembled from one end to the other. As shown in FIG. 3, the adjacent intermediate members 104 and inner and outer members 101 and 102 are each sealingly joined by continuous circumferential welds, as at 111 and 112, which, due to the relatively close radial clearance, can easily bridge the clearance spaces. In another manner of joining the tubular members, the opposite ends of the intermediate members 104' can be respectively upset as best seen in FIG. 4A to provide enlarged and reduced-diameter end flanges 115 and 116 for engagement with the inner and outer members 101 and 102. Suitable welds, as at 117 and 118, will join the tubular members 101, 102 and 104' to one another. Similarly, as seen in FIG. 4B, only one or the other end of an intermediate member 104" can be upset, as at 119, for engagement with the adjacent member 102. The other end is arranged in the same manner as shown in FIG. 3.

It will be appreciated, therefore, that the configuration shown in FIGS. 3, 4A and 4B will provide a tortuous longitudinal path along the housing sections 100 that will be substantially equal to three times the straight-line distance between the opposite ends of each section. Moreover, the ends 105, 106, 108 and 109 (FIG. 3) will provide a plurality of abrupt surfaces or interfaces that are transverse to the central axis 103 of the housing 100.

Although experimentation has proven that the configuration depicted in FIGS. 3, 4A and 4B provides a superior, sonically deadened housing, it is, of course, difficult to precisely weight the effect of the various factors which are responsible for such performance. Accordingly, the following explanation founded on logical scientific analysis is offered, however, as the best expression of the inventors' understanding of the principles underlying the operation of the present invention.

First of all, as best seen in FIG. 5 where a schematic representation is shown of a sonic path 200 having three parallel legs 201–203 arranged into somewhat of an S shape. Assuming that a sonic signal has been transmitted along the path 200 in the direction of the arrow 204, the transmitted signal may be considered as being in the form of a plurality of spaced wave fronts, as at 205, that are progressively moving along the first leg 201 of the path. When one of the wave 205 impinges on the transverse surface 206 at the end of the leg 201 (which surface provides an interface between two different media such as the metal path 200 itself and the fluid in the surrounding environment), a portion of the sonic energy will continue on out into the environment, as at 207. A major portion of the sonic energy will, of course, be reflected from the surface 206. The reflected energy will, however, have a divided path by which it can return so that whatever sonic waves are reflected will be divided into two wave portions 208 and 209 at the first reversal of the path 200. Thus, the one portion 208 of the reflected wave will return back up the first leg 201 toward its source and the other portion 209 of the reflected wave will continue on down the path 200 but along its second leg 202.

Similarly, when the portion 209 of the first reflected wave continuing down the second leg 202 comes to the transverse surface 210 at the end of the second leg, another three-way division of the sonic energy will occur. A portion 211 of this continuing wave 209 will continue on into the environment. The balance of the energy will again be reflected from the interface surface 210 and split, with one wave portion 212 returning back up the second leg 202 and the other wave portion 213 continuing on down the third leg 203 of the path 200. There will, of course, be reflections of the reflections, but these will be subject to the same action.

It is established that the reflection of a sonic signal is governed by the nature of both the medium in which the sound is traveling as well as the nature of the contiguous medium. The ratio of the characteristic impedances ($\rho \cdot C$) or match between the two media will determine the proportion of the transmitted and reflected waves. As explained in greater detail in "Fundamentals of Acoustics," Kinsler and Frey (Wiley 1962), the energy reflected from an interface, as at 206, in FIG. 5 will be determined from the following formula:

$$\alpha_R = 1 - \frac{4(\rho_2 C_2)(\rho_1 C_1)}{(\rho_2 C_2 + \rho_1 C_1)^2}$$

where:
$\alpha_R$=reflection coefficient
$\rho_1$=density of medium in which sound is initiated
$C_1$=velocity of sound in medium in which sound is initiated
$\rho_2$=density of medium contiguous to terminal surface of first medium
$C_2$=velocity of sound in medium contiguous to terminal surface of first medium Accordingly, where the conducting medium is steel and the surrounding medium is water, substitution of their respective properties with consistent dimensional units into the above formula will result in:

where:

$\rho_1 = 7,700$-kg./m.$^3$ (steel)
$C_1 = 5,050$-m./sec. (steel)
$\rho_2 = 1,000$-kg./m.$^3$ (water)
$C_2 = 1,481$-m./sec. (water)

$$\alpha_R = 1 - \frac{4(1,000)(1,481)(7,700)(5,050)}{(1,000)(1,481) + (7,700)(5,050)^2}$$

$$= 1 - \frac{2.31 \times 10^{14}}{16.30 \times 10^{14}} = 1 - 0.14$$

$\alpha_R = 0.86$.

Thus, where steel and water are the two media under consideration, 86% of the sonic energy traveling along the path 200 will be reflected at each transverse surface, as at 206. The remaining 14% of the energy will be transmitted into the surrounding medium, as at 207, where it is soon dissipated.

The reflected waves will then divide into the two portions, as at 208 and 209, to continue their respective courses. Although it has not been accurately determined, it would seem only logical that the relative magnitudes of the two reflected portions 208 and 209 will be at least somewhat dependent upon the angle of the transverse surface 206 to the longitudinal axes of the two legs 201 and 202 as well as upon the relative transverse cross-sectional areas of each of these legs. Thus, where the transverse surface 206 is normal to the longitudinal axes of the two legs 201 and 202 and these two legs have about the same transverse cross-sectional area, it would seem that the division of reflected energy would be about equal. If this is the case, then for a given signal, as at 205, 14% of the energy in this signal will continue on out into the surrounding medium, as at 207, where it is dissipated, about 43% of the energy will return, as at 208, back up the first leg 201 and the remaining 43% will be reflected on down the second leg 202 as at 209.

The same effect will occur to the one wave portion 209 traveling down the second leg 202 of the path 200. When this wave portion 209 strikes the interface at the next transverse surface 210, 14% of this energy will be transmitted into the fluid exterior thereof (as at 211) and the remaining energy will further divide into two other wave portions 212 and 213. Here again, if the transverse surface 210 is normal to the line of travel and the transverse cross-sectional areas of the legs 202 and 203 are about equal, then only 43% of this energy will be directed into the third leg 203. Thus, of the initial energy, only slightly more than 18% of it will theoretically reach the third leg 203 (43×43%).

In practice, therefore, the amount of sonic energy reaching a given point will be $(0.43)^n$ where $n$ is the number of reflections. The significance of this will be realized where, for example, a housing is comprised of sections having the dimensions mentioned above with reference to FIG. 3. In that example, there would be eight modules per foot of length to provide 32 interfaces per foot. Thus, for each foot of the exemplary sections, the reflections of sonic energy would allow only $(0.43)^{32}$ or about $1.87 \times 10^{-12}$ of the original energy to reach the end of that one-foot long section.

On the other hand, it appears likely that more energy can be reflected back toward the source by making the transverse surfaces 206 and 210 inclined relative to the central axis, for example, by inclining the surface 206 where the upper end thereof is to the right of its lower end, more of the reflected sonic energy should be returned down the leg 201.

It will be appreciated, therefore, that the multiple reflections of sonic energy traveling along a reversed path, as at 200, will quickly dissipate and attenuate a significant amount of the initial sonic energy. The degree of attenuation as well as dissipation will, of course, be proportionately related to at least the number of reversals taken by the sonic signal. Each reversal will have a dual reducing effect on the sonic energy, i.e., by reflection of a major portion of the energy back up the path and by dissipation of a minor but still significant portion of the energy into the surrounding medium at each turn.

The inventors further note the selection of a quarter wavelength as the distance between interfaces 301 and 302 can also contribute to the success of the present invention as schematically illustrated in FIG. 6. It is theoretically possible that the returning reflected wave portions can be so phased that they will themselves be re-reflected and be out of phase with a successive wave to partially cancel that wave. In this manner, it is believed that the housings of the present invention are not susceptible to ringing but instead quickly dampen any resonating sonic energy that would otherwise promote ringing.

To accomplish this phase cancellation, a sonic path 300 as seen in FIG. 6 is so arranged that it is one-quarter wavelength for the material of the path between opposite transverse surfaces 301 and 302. It will be appreciated, of course, that odd multiples of a quarter wavelength will also perform in the same manner to provide such cancellations. If a sonic wave is started at the left-hand end of the path 300 as viewed in FIG. 6, it is assumed to initially have a wave form as shown at 303. Then, by the time that the sonic wave has traveled the length of the path 300, its phase will have changed one-quarter of a wavelength as schematically illustrated at 304. Reflection of the wave at the transverse surface 302 will, of course, produce a reflected wave that is 180° out of phase with the initial wave 304 as schematically illustrated at 305. Similarly, as the reflected wave 305 returns back up the path 300, it will have shifted a quarter wavelength by the time it reaches the first surface 301 and have a wave form as depicted at 306. Reflection of the returning wave will again cause the re-reflected wave 307 to be 180° out of phase with the returning wave 306.

Accordingly, as best seen by comparison of the schematic wave forms 303–307, the re-reflected wave 307 will be 180° out of phase with the next following wave (not shown but having a wave form the same as at 303). Since the two waves will not have the same amplitude, only partial cancellation of the second wave will be accomplished by the re-reflected wave. Using the previously discussed formula to determine what portion of a sonic wave will be reflected, it will be seen that if there was no diverging path for a portion of the re-reflected energy to take, the amplitude of the re-reflected wave would be nearly 75% (86×86%) of the amplitude of the second wave. On the other hand, even if there is an equal divergence of the path at a transverse surface (as in the case of the path 200 in FIG. 5), the re-reflected wave would still have an amplitude of 37% of that of the second wave. Thus, it seems to be of benefit to produce as much reflection as possible to increase the amplitude of each re-reflected wave and promote cancellation of at least part of the succeeding waves.

Returning to FIG. 3 now, the housing sections 100 are each made so that each outer sleeve 102 will be a quarter wavelength at the excitation frequency for the material used to form the housing sections. By employing a number of modular units or assemblies of the sleeves 101, 102 and 104, the housing sections 100 can be arranged to space the transducers 16–18 as required. As it is customary to space the receiving transducers 17 and 18 a substantial distance apart, it will be appreciated that a great number of the modular assemblies will be required in each instance. In this manner, an equally large number of reflecting surfaces as at 105 and 108 will be provided to accomplish the desired attenuation and dissipation of sonic energy traveling along the lower housing 11 from the transmitting transducer 16 to the receiving transducers 17 and 18. Similarly, should extrinsic sonic energy enter the housing 11, the substantial attenuation afforded by the present invention will prevent such spurious energy from interferring with the proper operation of the logging tool 10.

To prevent entry of foreign matter into the external annular spaces 113, sealing means, such as an annular band 115 or a bonded seal 116 of a resilient or elastomeric material are fitted into the external gaps 110. A substance, such as a grease, oil, or water, is preferably placed into the external annular spaces 113 to equalize the pressure across the bands 115 or seals 116 and to keep the spaces clean.

Accordingly, it will be appreciated that the present invention provides means for materially attenuating and substantially decreasing the magnitude of sonic energy traveling along a housing for a sonic tool. Although the above-mentioned theories may or may not be completely applicable, insofar as is now known they would seem to be at least partially responsible for the achieved results. In any event, however, housings constructed in accordance with the present invention have proven to be quite successful in preventing longitudinal travel of sonic energy as well as undesirable ringing of the housing. Of equal significance, the housings of the present invention have been found to be more rigid than housings of the prior art. By providing such extra-rigid housings that are nevertheless sonically deadened, sonic logging tools can be made much longer than has been possible heretofore without being so flexible that even careful handling can damage the tools.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Sonic well-logging apparatus comprising: at least two sonic transducers at longitudinally-spaced intervals along a common central axis; and means for carrying said transducers and materially restricting longitudinal travel of sonic energy therealong including first and second tubular members disposed between said transducers at longitudinally-spaced intervals along said axis, a third tubular member telescopically arranged relative to said longitudinally-spaced tubular members defining an annular space therebetween and having its opposite end portions respectively overlapping the opposed end portions of said longitudinally-spaced tubular members, and means for joining said tubular members including first and second intermediate tubular members in said annular space, said first intermediate tubular member extending between said opposed end portion of said first tubular member and one of said end portions of said third tubular member, said second intermediate tubular member extending between said opposed end portion of said second tubular member and the other of said end portions of said third tubular member.

2. The apparatus of claim 1 wherein said tubular members are of metal.

3. The apparatus of claim 1 wherein one of said transducers is adapted to emit a signal at a predetermined frequency and at least one of said tubular members is substantially a quarter-wavelength long at said predetermined frequency.

4. The apparatus of claim 1 wherein at least some of the transverse end surfaces of some of said tubular members are substantially normal to said axis.

5. The apparatus of claim 4 wherein one of said transducers is adapted to emit a signal at a predetermined frequency and the length of said tubular members does not substantially exceed a quarter-wavelength at said predetermined frequency.

6. Sonic well-logging apparatus comprising: at least two sonic transducers at longitudinally-spaced intervals along a common central axis; and housing means for enclosing said transducers and materially restricting longitudinal travel of sonic energy therealong including first and second tubular metal members of a uniform diameter disposed between said transducers at longitudinally-spaced intervals along said axis, a third tubular metal member of a different diameter coaxially telescoped relative to said longitudinally-spaced tubular members defining an annular space therebetween and having its opposite end portions respectively overlapping the opposed end portions of said longitudinally-spaced tubular members, first and second tubular metal members of an intermediate diameter in said annular space, said first intermediate tubular member extending between said opposed end portion of said first tubular member and one of said end portions of said third tubular member and being joined thereto, said second intermediate tubular member extending between said opposed end portion of said second tubular portion and the other of said end portions of said third tubular member and being joined thereto.

7. The apparatus of claim 6 wherein said intermediate tubular members are joined to the respective ones of said longitudinally-spaced tubular members by continuous joints for fluidly sealing the interior of said housing means.

8. The apparatus of claim 7 wherein the transverse end surfaces of at least some of said longitudinally-spaced tubular members are normal to said central axis.

9. The apparatus of claim 7 further including means for exciting one of said transducers to produce a sonic signal of a predetermined frequency and the lengths of said longitudinally-spaced tubular members do not exceed a quarter-wavelength at said predetermined frequency.

10. The apparatus of claim 9 wherein at least some of the transverse end surfaces of said longitudinally-spaced tubular members are substantially normal to said central axis.

11. Sonic logging apparatus comprising: at least two sonic transducers at longitudinally-spaced intervals along a common central axis and adapted for operation at a predetermined frequency; means for enclosing said transducers including first and second housing members respectively enclosing said first and second transducers; and means between said housing members for materially restricting the longitudinal travel of sonic energy comprising a plurality of inner and outer overlapping, telescoped tubular sections alternately staggered along said axis and longitudinally spaced from their companion sections, a plurality of intermediate tubular sections coaxially disposed between said inner and outer members, and means joining one end of each intermediate section to the adjacent end of an inner member and the other end of each intermediate section to the adjacent end of an outer member.

12. The apparatus of claim 11 wherein at least some of the transverse end surfaces of some of said tubular sections are substantially perpendicular to said axis.

13. The apparatus of claim 11 wherein the lengths of at least some of said inner and outer tubular sections do not substantially exceed an odd multiple of a quarter-wavelength at said predetermined frequency.

14. The apparatus of claim 12 wherein the lengths of said inner and outer tubular sections are substantially a quarter-wavelength at said predetermined frequency.

15. The apparatus of claim 14 wherein said tubular sections are joined by continuous joints for fluidly sealing the interior of said inner tubular sections and further including means connecting said tubular sections and housing members and means fluidly enclosing the interior of said outer tubular sections.

References Cited
UNITED STATES PATENTS

| | | | |
|---|---|---|---|
| 2,722,282 | 11/1955 | McDonald | 181—.5 |
| 2,790,964 | 4/1957 | Schurman | 340—18 X |
| 2,993,553 | 7/1961 | Howes | 181—.5 |
| 3,102,604 | 9/1963 | Engle | 181—.5 |
| 3,144,090 | 8/1964 | Maffagatti | 181—.5 |

BENJAMIN A. BORCHELT, *Primary Examiner.*

R. M. SKOLNIK, *Assistant Examiner.*